US008144926B2

(12) United States Patent  (10) Patent No.: US 8,144,926 B2
Mori et al.  (45) Date of Patent: Mar. 27, 2012

(54) VEHICLE AND LANE RECOGNITION DEVICE

(75) Inventors: Naoki Mori, Wako (JP); Sachio Kobayashi, Wako (JP); Tomoyoshi Aoki, Wako (JP); Takuma Nakamori, Wako (JP)

(73) Assignee: Honda Motor Co., Ltd, Tokoyo (JP)

( * ) Notice: Subject to any disclaimer, the term of this patent is extended or adjusted under 35 U.S.C. 154(b) by 1121 days.

(21) Appl. No.: 11/919,641

(22) PCT Filed: Jun. 20, 2006

(86) PCT No.: PCT/JP2006/312290
§ 371 (c)(1),
(2), (4) Date: Oct. 31, 2007

(87) PCT Pub. No.: WO2007/000911
PCT Pub. Date: Jan. 4, 2007

(65) Prior Publication Data
US 2009/0080704 A1    Mar. 26, 2009

(30) Foreign Application Priority Data

Jun. 27, 2005 (JP) .................................. 2005-186382

(51) Int. Cl.
*G06K 9/00* (2006.01)
(52) U.S. Cl. ........................ 382/103; 701/200
(58) Field of Classification Search .................. 382/100, 382/103, 104, 181, 195, 199, 203; 701/200, 701/300, 301, 23
See application file for complete search history.

(56) References Cited

U.S. PATENT DOCUMENTS 5,555,312 A * 9/1996 Shima et al. .................. 382/104
5,661,472 A * 8/1997 Koshizawa .................... 340/901
(Continued)

FOREIGN PATENT DOCUMENTS

JP    62-221800 A    9/1987
(Continued)

OTHER PUBLICATIONS

Thorpe C: *"Toward Autonomous Driving: The CMU Navlab. Part I-Perception"*, Aug. 1, 1991, pp. 31-42, vol. 6, No. 4, New York, NY, US.

(Continued)

*Primary Examiner* — Anand Bhatnagar
(74) *Attorney, Agent, or Firm* — Arent Fox, LLP

(57) ABSTRACT

There is provided an image acquisition means (2) for acquiring a color image of a road via an imaging means (9) mounted on a vehicle (8), a lane mark detection means (3, 4) for performing processing of detecting lane marks of a plurality of predetermined colors different from each other on the road based on color information of the color image, and outputting a result of the processing as lane mark candidate data, and a selection means (6) for selecting lane mark candidate data corresponding to a lane mark defining an actual lane on which the vehicle (8) is traveling from among at least the lane mark candidate data for the respective predetermined colors output from the lane mark detection means (3, 4), and determining and outputting lane data indicating information of the actual lane based on the selected lane mark candidate data. Therefore, even if there are lane marks of different colors on the road, the lane marks of the respective colors can be recognized appropriately from the color image of the road acquired via the imaging means such as a camera.

36 Claims, 6 Drawing Sheets

U.S. PATENT DOCUMENTS

| | | | | |
|---|---|---|---|---|
| 6,281,805 B1* | 8/2001 | Lee | ............................... | 340/901 |
| 6,526,352 B1* | 2/2003 | Johnson et al. | ............... | 701/213 |
| 6,879,706 B2* | 4/2005 | Satoh et al. | ................... | 382/104 |
| 7,369,172 B2* | 5/2008 | Fujii | ............................. | 348/342 |

FOREIGN PATENT DOCUMENTS

| | | |
|---|---|---|
| JP | 05-151341 A | 5/1993 |
| JP | 11-213155 A | 6/1999 |
| JP | 2003-123058 A | 4/2003 |
| JP | 2003-317106 A | 11/2003 |
| JP | 2004-139338 A | 5/2004 |

OTHER PUBLICATIONS

Gehrig S K et al: *"Lane Recognition on Poorly Structured Roads—The Bots Dot Problem in California"*, The IEEE 5$^{TH}$ International Conference on Intelligent Transportation Systems, 2002. Proceedings., Sep. 2002, pp. 67-71, Piscataway, NJ, USA.

Kluge K et al: *"The Yarf System for Vision-Based Road Following"* Mathematical and Computer Modelling, Aug. 1, 1995, pp. 213-233, vol. 22, No. 4-7, UK.

Dickmanns E D *"The Development of Machine Vision for Road Vehicles in the Last Decade"*, Intelligent Vehicle Symposium, Jun. 17, 2002, pp. 268-281, vol. 1, Piscataway, NJ, USA.

Kluge K et al: *"Representation and Recovery of Road Geometry in Yarf"*, Intelligent Vehicles '92 Symposium., Proceedings of the Detroit, Jun. 29, 1992, pp. 114-119, New York, NY, USA.

Se-Young Oh et al: *"Three-Feature Based Automatic Lane Detection Algorithm (TFALDA0 For Autonomous Driving"*, Transactions on Intelligent Transportation Systems, Service Center, Dec. 1, 2003, pp. 219-225, vol. 4, No. 4, Piscataway, NJ, US.

Rotaru C et al: *"Extracting Road Features From Color Images Using a Cognitive Approach"* Intelligent Vehicles Symposium, 2004, Parma, Italy, Jun. 14, 2004, pp. 298-303, Piscataway, NJ.

\* cited by examiner

VEHICLE AND LANE RECOGNITION DEVICE

CROSS-REFERENCE TO RELATED APPLICATION

This application is a National Stage entry of International Application No. PCT/JP2006/312290, filed Jun. 20, 2006, the entire specification claims and drawings of which are incorporated herewith by reference.

TECHNICAL FIELD

The present invention relates to a vehicle and a lane recognition device that recognize a lane mark on a road by processing an image of the road obtained via an imaging means such as a camera.

BACKGROUND ART

In recent years, a lane mark recognition device is known wherein imaging means such as a CCD camera mounted on a vehicle picks up an image of a surface of the road on which the vehicle is traveling, and the picked-up image is processed to detect lane marks provided on the road for marking travel lanes. For the lane marks provided on the road, the following two types of lane marks are used: lane marks of a line type, such as a lane-marking line (white line); and lane marks of a stud type provided discretely, such as Botts Dots (Nonretroreflective Raised Pavement Markers) and a cat's eye (Retroreflective Raised Pavement Marker). Thus, there has been proposed a technique to accurately detect a plurality of shapes of lane marks by switching recognition algorithm in accordance with the shape of the lane mark (see, e.g., Japanese Patent Laid-Open No. 2003-317106 (hereinafter, referred to as "Patent Document 1")).

The travel path recognition device of Patent Document 1 is provided with a straight-line detection processing unit that performs detection based on segment components of a picked-up image and a pattern matching processing unit that performs detection based on a pattern corresponding to the shape of the lane mark of a metal stud or the like, and it performs detection of the travel path based on a result of detection by either the straight-line detection processing unit or the pattern matching processing unit that is designated as means to be used for detection. In the state where one of the straight-line detection processing unit and the pattern matching processing unit is designated as the means to be used for detection, if it is no longer possible for the designated unit to detect the lane marks with accuracy, then the travel path recognition device switches the unit by designating the other unit as the means to be used for detection.

Meanwhile, the lane marks of similar shapes may have different colors, such as white lines and yellow lines. If they are different in color, even if they are similar in shape, it may be difficult to detect the lane marks using the same recognition algorithm. For example, the yellow line is lower in luminance than the white line, and has only a small difference in luminance with the road surface. Thus, the yellow line may not be recognized as a lane mark using the algorithm that detects a white line based on the luminance. Further, since the lane marks of different colors have different meanings in the road rules, it is desirable to appropriately recognize the lane marks of respective colors. With the device of Patent Document 1, however, the color of the lane mark is not taken into consideration upon recognition of the lane mark, which hinders appropriate recognition of the lane marks of different colors.

DISCLOSURE OF THE INVENTION

Problems to be Solved by the Invention

An object of the present invention is to provide a vehicle and a lane recognition device that can eliminate the above-described inconveniences and appropriately recognize, even if there are lane marks of a plurality of colors on a road, the lane marks of the respective colors from a color image of the road obtained via imaging means such as a camera.

Means for Solving the Problems

To achieve the above object, a vehicle according to the present invention includes: an imaging means; an image acquisition means for acquiring a color image of a road via the imaging means; a lane mark detection means for performing processing of detecting lane marks of a plurality of predetermined colors different from each other on the road based on color information of the color image, and outputting a result of the processing as lane mark candidate data; and a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data.

Further, a lane recognition device according to the present invention includes: an image acquisition means for acquiring a color image of a road via an imaging means mounted on a vehicle; a lane mark detection means for performing processing of detecting lane marks of a plurality of predetermined colors different from each other on the road based on color information of the color image, and outputting a result of the processing as lane mark candidate data; and a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data (first invention).

According to the vehicle and the lane recognition device of the first invention, the lane mark detection means perform processing of detecting lane marks of a plurality of predetermined colors different from each other on the road based on the color information of the color image, and output the results of the processing as lane mark candidate data. Here, the lane marks may have different colors, such as white and yellow lines. The lane mark detection means detect the lane marks in accordance with the colors based on the color information of the color image, which ensures accurate detection of the lane marks of the respective colors.

The lane mark candidate data output as the result of detection includes data corresponding to the lane mark that defines an actual lane on which the vehicle is traveling. For example, in the case where the lane mark is a yellow line, the lane mark candidate data that is output as a result of processing of detecting a yellow lane mark becomes the data corresponding to the lane mark defining the actual lane. Thus, by selecting the lane mark candidate data corresponding to the lane mark defining the actual lane on which the vehicle is traveling from among the lane mark candidate data for the predetermined colors being output and by determining the lane data indicating the information of the actual lane based on the selected lane mark candidate data, the selection means can appropriately determine the lane data of the lane on which the vehicle is traveling.

As such, even if there are lane marks of different colors on the road, the vehicle and the lane recognition device of the first invention can recognize the lane marks of the respective colors with accuracy, and hence can appropriately recognize the lane on which the vehicle is traveling. It is noted that the lane marks provided on the road include, for example, lane marks of a line type, such as lane-marking lines (white lines), and lane marks of a stud type provided discretely, such as the Botts Dots and the cat's eye.

Further, in the case of detecting a lane mark having a distinctive shape such as a lane mark of a stud type by image processing, it is also possible to detect the same based on a shape pattern. Accordingly, it is preferable that each of the vehicle and the lane recognition device according to the first invention further includes road stud detection means for performing processing of detecting a lane mark of a stud type on the road on which the vehicle is traveling from the color image based on a shape pattern of the lane mark of the stud type, and outputting a result of the processing as lane mark candidate data, and that the selection means selects the lane mark candidate data corresponding to the lane mark defining the actual lane on which the vehicle is traveling from among the lane mark candidate data for the respective predetermined colors output from the lane mark detection means and the lane mark candidate data output from the road stud detection means (second invention).

According to the second invention, the road stud detection means performs the processing of detecting the lane mark of a stud type on the road on which the vehicle is traveling from the color image based on the shape pattern of the lane mark of the stud type, and outputs the result of the processing as the lane mark candidate data, which ensures accurate detection of the lane mark of the stud type having the distinctive shape. It is noted that, in the case where the lane mark of the stud type is applied with a distinctive color, the road stud detection means may detect the lane mark using the color information as well.

The lane mark candidate data thus output as the result of detection are added to the lane mark candidate data for the predetermined colors output from the lane mark detection means. Then, the selection means selects the lane mark candidate data corresponding to the lane mark defining the actual lane on which the vehicle is traveling from among these pieces of lane mark candidate data. Therefore, even if there are lane marks of a stud type having the distinctive shape on the road in addition to the lane marks of different colors, the vehicle and the lane recognition device of the second invention can recognize the respective lane marks with accuracy, and hence appropriately recognize the lane on which the vehicle is traveling.

Further, in the vehicle and the lane recognition device of the first or second invention, it is preferable that each of the lane mark candidate data has lane mark position data indicating a position of the lane mark, color information of the lane mark, and type information of the lane mark, that the lane data output by the selection means has shape information of the actual lane, color information of the lane mark defining the actual lane, and type information of the lane mark defining the actual lane, and that the selection means determines the shape information in the lane data based on the lane mark position data in the selected lane mark candidate data, determines the color information in the lane data based on the color information in the selected lane mark candidate data, and determines the type information in the lane data based on the type information in the selected lane mark candidate data (third invention).

According to the third invention, each of the lane mark candidate data has lane mark position data indicating a position of the lane mark, color information of the lane mark, and type information of the lane mark. Further, the lane data output by the selection means has shape information of the actual lane, color information of the lane mark defining the actual lane, and type information of the lane mark defining the actual lane. As such, in the case where there are a plurality of types of lane marks on the road, the vehicle and the lane recognition device of the third invention can acquire the shape information of the recognized lane as well as the color and type information of the lane mark defining the lane, and use these pieces of information for control of the vehicle or for notification to the driver.

The lane marks defining the lanes may have different meanings in the road rules according to their colors. For example, in Japan, the white center line and the yellow center line have different meanings in the road rules. Accordingly, it is preferable that the vehicle and the lane recognition device of the third invention includes a meaning determination means for performing processing of determining a meaning of the lane mark defining the lane based on the color information and the type information in the lane data output by the selection means, and outputting a result of the processing together with the lane data (fourth invention).

According to the fourth invention, the meaning determination means performs the processing of determining the meaning of the lane mark defining the lane based on the color information and the type information in the lane data output by the selection means, which ensures appropriate determination of the meaning of the lane mark in the road rules. The meaning determination means outputs the result of the processing together with the lane data, and accordingly, the vehicle and the lane recognition device of the fourth invention can perform control of the vehicle or notification to the driver in accordance with the meaning of the lane mark.

Further, in the vehicle and the lane recognition device of the third or fourth invention, it is preferable that the lane mark position data in each of the lane mark candidate data is comprised of coordinate data of a dot sequence indicating a route of the lane mark, and that the selection means obtains, for each of the lane mark candidate data, a polynomial of predetermined degree of at least second degree approximating the dot sequence based on the coordinate data of the dot sequence, and calculates a determination coefficient that is a coefficient indicating a degree of approximation of the dot sequence by the polynomial, to select the lane mark candidate data having the highest determination coefficient as the lane mark candidate data corresponding to the lane mark defining the actual lane (fifth invention).

According to the fifth invention, the selection means obtains, for each of the lane mark candidate data, a polynomial of predetermined degree of at least second degree approximating the dot sequence based on the coordinate data of the dot sequence. Since the shape of the lane is generally smooth, it is considered that the dot sequence indicating the position of the lane mark defining the lane can be appropriately approximated by the polynomial. Accordingly, by calculating a determination coefficient indicating the degree of approximation of the dot sequence by the polynomial and by selecting the lane mark candidate data having the highest determination coefficient as the lane mark candidate data corresponding to the lane mark defining the actual lane, the selection means can appropriately select the lane mark candidate data corresponding to the lane mark defining the actual lane.

The polynomial approximating the dot sequence of the selected lane mark candidate data approximates the route of the lane mark; i.e., it accurately represents the shape of the lane defined by the lane mark. Accordingly, in the vehicle and the lane recognition device of the fifth invention, it is preferable that the selection means determines the shape information in the lane data based on the polynomial approximating the dot sequence of the selected lane mark candidate data (sixth invention).

According to the sixth invention, the selection means determines the shape information in the lane data based on the polynomial approximating the dot sequence of the selected lane mark candidate data. Accordingly, it is possible to accurately determine the shape information of the lane on which the vehicle is traveling by utilizing the polynomial calculated when selecting the lane mark candidate.

Generally, the lane on which the vehicle is traveling is configured by a left side line defining the left side and a right side line defining the right side of the lane, and the left side line and the right side line are defined by the lane marks, respectively.

Therefore, in the vehicle and the lane recognition device of the first or second invention, it is preferable that each of the lane mark candidate data is comprised of left lane mark candidate data that is candidate data for a lane mark defining a left side of the lane and right lane mark candidate data that is candidate data for a lane mark defining a right side of the lane. The left lane mark candidate data each have lane mark position data indicating a position of the lane mark defining the left side of the lane, color information of the lane mark, and type information of the lane mark. Further, the right lane mark candidate data each have lane mark position data indicating a position of the lane mark defining the right side of the lane, color information of the lane mark, and type information of the lane mark. Furthermore, the lane data output by the selection means has left shape information that is shape information of a left side line defining a left side of the actual lane, left color information that is color information of the lane mark defining the left side line, left type information that is type information of the lane mark defining the left side line, right shape information that is shape information of a right side line defining a right side of the actual lane, right color information that is color information of the lane mark defining the right side line, and right type information that is type information of the lane mark defining the right side line.

Further, it is preferable that the selection means selects the left lane mark candidate data corresponding to the lane mark defining the left side of the actual lane from among the left lane mark candidate data, and selects the right lane mark candidate data corresponding to the lane mark defining the right side of the actual lane from among the right lane mark candidate data. Furthermore, the selection means determines the left shape information in the lane data based on the lane mark position data in the selected left lane mark candidate data, determines the left color information in the lane data based on the color information in the selected left lane mark candidate data, and determines the left type information in the lane data based on the type information in the selected left lane mark candidate data. The selection means also determines the right shape information in the lane data based on the lane mark position data in the selected right lane mark candidate data, determines the right color information in the lane data based on the color information in the selected right lane mark candidate data, and determines the right type information in the lane data based on the type information in the selected right lane mark candidate data (seventh invention).

According to the seventh invention, the lane data output by the selection means has left shape information that is shape information of the left side line, left color information that is color information of the lane mark defining the left side line, and left type information that is type information of the lane mark defining the left side line. Further, the lane data output by the selection means has right shape information that is shape information of the right side line, right color information that is color information of the lane mark defining the right side line, and right type information that is type information of the lane mark defining the right side line. Accordingly, in the case where there are a plurality of types of lane marks on the road, the vehicle and the lane recognition device of the seventh invention can acquire the shape information of the recognized left and right side lines as well as the color information and the type information of the lane marks defining the left and right side lines, and use these pieces of information for control of the vehicle or notification to the driver.

The lane marks defining the left and right side lines may have different meanings in the road rules according to their colors. Thus, it is preferable that the vehicle and the lane recognition device of the seventh invention each include meaning determination means for performing processing of determining meanings of the lane marks defining the left side line and the right side line based on the left color information, the right color information, the left type information, and the right type information in the lane data output by the selection means, and outputting a result of the processing together with the lane data (eighth invention).

According to the eighth invention, the meaning determination means performs the processing of determining the meanings of the lane marks defining the left and right side lines based on the left color information, the right color information, the left type information, and the right type information in the lane data output by the selection means, so that it can appropriately determine the meanings of the lane marks in the road rules. Then, the meaning determination means outputs the results of the processing together with the lane data, and accordingly, the vehicle and the lane recognition device of the eighth invention can perform control of the vehicle or notification to the driver in accordance with the meanings of the lane marks.

Further, in the vehicle and the lane recognition device of the seventh or eighth invention, it is preferable that the lane mark position data in each of the left lane mark candidate data is comprised of coordinate data of a left dot sequence that is a dot sequence indicating a route of the lane mark defining the left side of the lane. Further, the lane mark position data in each of the right lane mark candidate data is comprised of coordinate data of a right dot sequence that is a dot sequence indicating a route of the lane mark defining the right side of the lane.

Furthermore, it is preferable that the selection means obtains, for each of the left lane mark candidate data, a polynomial of predetermined degree of at least second degree approximating the left dot sequence based on the coordinate data of the left dot sequence, and calculates a determination coefficient that is a coefficient indicating a degree of approximation of the left dot sequence by the polynomial, to select the left lane mark candidate data having the highest determination coefficient as the left lane mark candidate data corresponding to the lane mark defining the left side of the actual lane, and also obtains, for each of the right lane mark candidate data, a polynomial of predetermined degree of at least second degree approximating the right dot sequence based on the coordinate data of the right dot sequence, and calculates a determination coefficient that is a coefficient indicating a degree of approximation of the right dot sequence by the polynomial, to select the right lane mark candidate data having the highest determination coefficient as the right lane mark candidate data corresponding to the lane mark defining the right side of the actual lane (ninth invention).

According to the ninth invention, the selection means obtains, for each of the left lane mark candidate data, a polynomial of predetermined degree of at least second degree approximating the left dot sequence based on the coordinate data of the left dot sequence, and also obtains, for each of the right lane mark candidate data, a polynomial of predetermined degree of at least second degree approximating the right dot sequence based on the coordinate data of the right dot sequence.

The shape of the lane is generally smooth, and thus, it is considered that the left dot sequence and the right dot sequence indicating the positions of the lane marks defining the left side line and the right side line, respectively, are appropriately approximated by the polynomials. Therefore, the selection means calculates a determination coefficient indicating the degree of approximation of the left dot sequence by the polynomial, and selects the left lane mark candidate data having the highest determination coefficient as the left lane mark candidate data corresponding to the lane mark defining the left side line. Further, the selection means calculates a determination coefficient indicating the degree of approximation of the right dot sequence by the polynomial, and selects the right lane mark candidate data having the highest determination coefficient as the right lane mark candidate data corresponding to the lane mark defining the right side line. In this manner, the selection means can appropriately select the left lane mark candidate data corresponding to the lane mark defining the left side line and the right lane mark candidate data corresponding to the lane mark defining the right side line.

At this time, the polynomial approximating the left dot sequence of the selected left lane mark candidate data and the polynomial approximating the right dot sequence of the selected right lane mark candidate data each approximate a route of the lane mark, and thus, they accurately represent the shapes of the left side line and the right side line defined by the lane marks. Therefore, in the vehicle and the lane recognition device of the ninth invention, it is preferable that the selection means determines the left shape information in the lane data based on the polynomial approximating the left dot sequence of the selected left lane mark candidate data, and determines the right shape information in the lane data based on the polynomial approximating the right dot sequence of the selected right lane mark candidate data (tenth invention).

According to the tenth invention, the left shape information is determined based on the polynomial approximating the left dot sequence of the selected left lane mark candidate data, and the right shape information is determined based on the polynomial approximating the right dot sequence of the selected right lane mark candidate data. Accordingly, it is possible to accurately determine the shape information of the lane on which the vehicle is traveling by utilizing the polynomials respectively approximating the left dot sequence and the right dot sequence that are calculated when selecting the lane mark candidates.

BEST MODE FOR CARRYING OUT THE INVENTION

Figure 1:
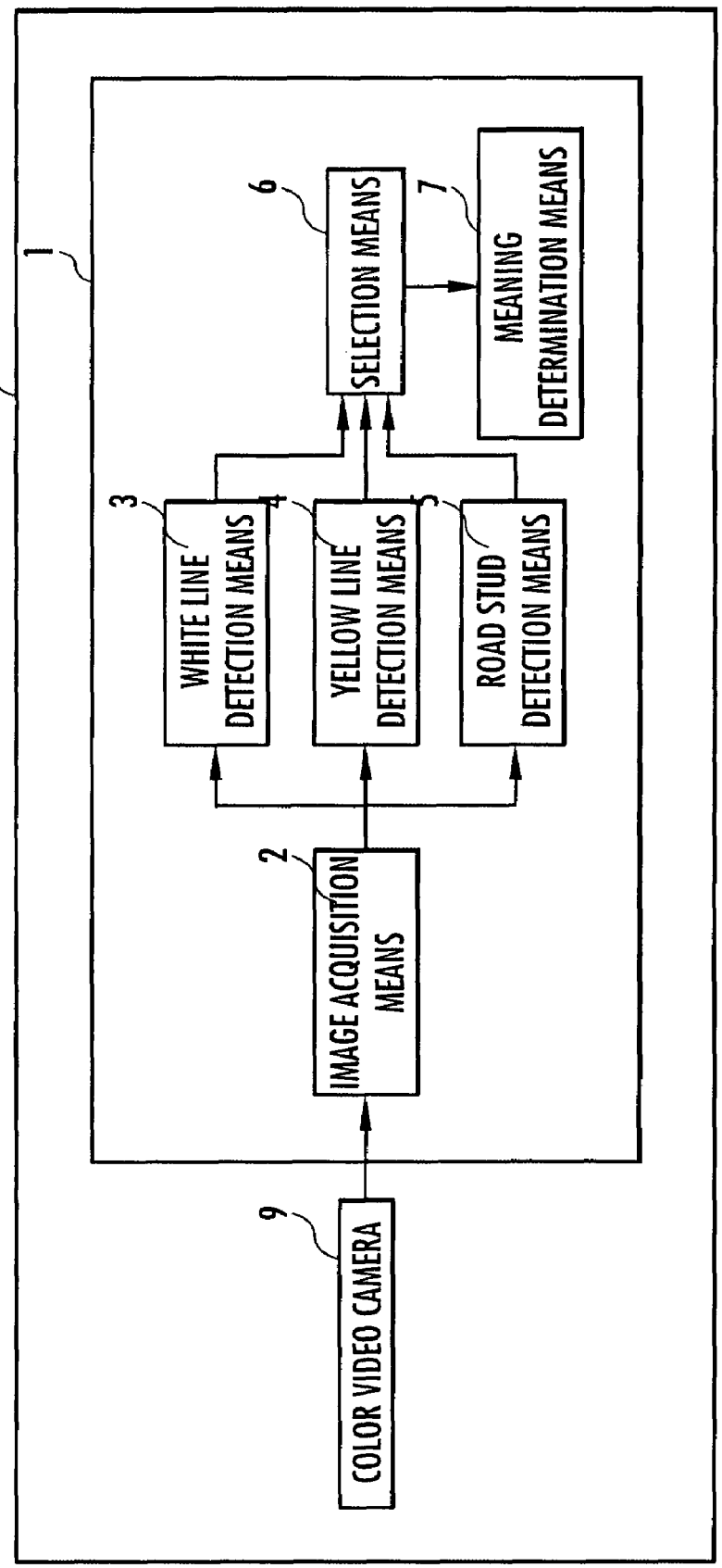
FIG. 1 It is a functional block diagram of a lane recognition device according to an embodiment of the present invention.
Figure 4:
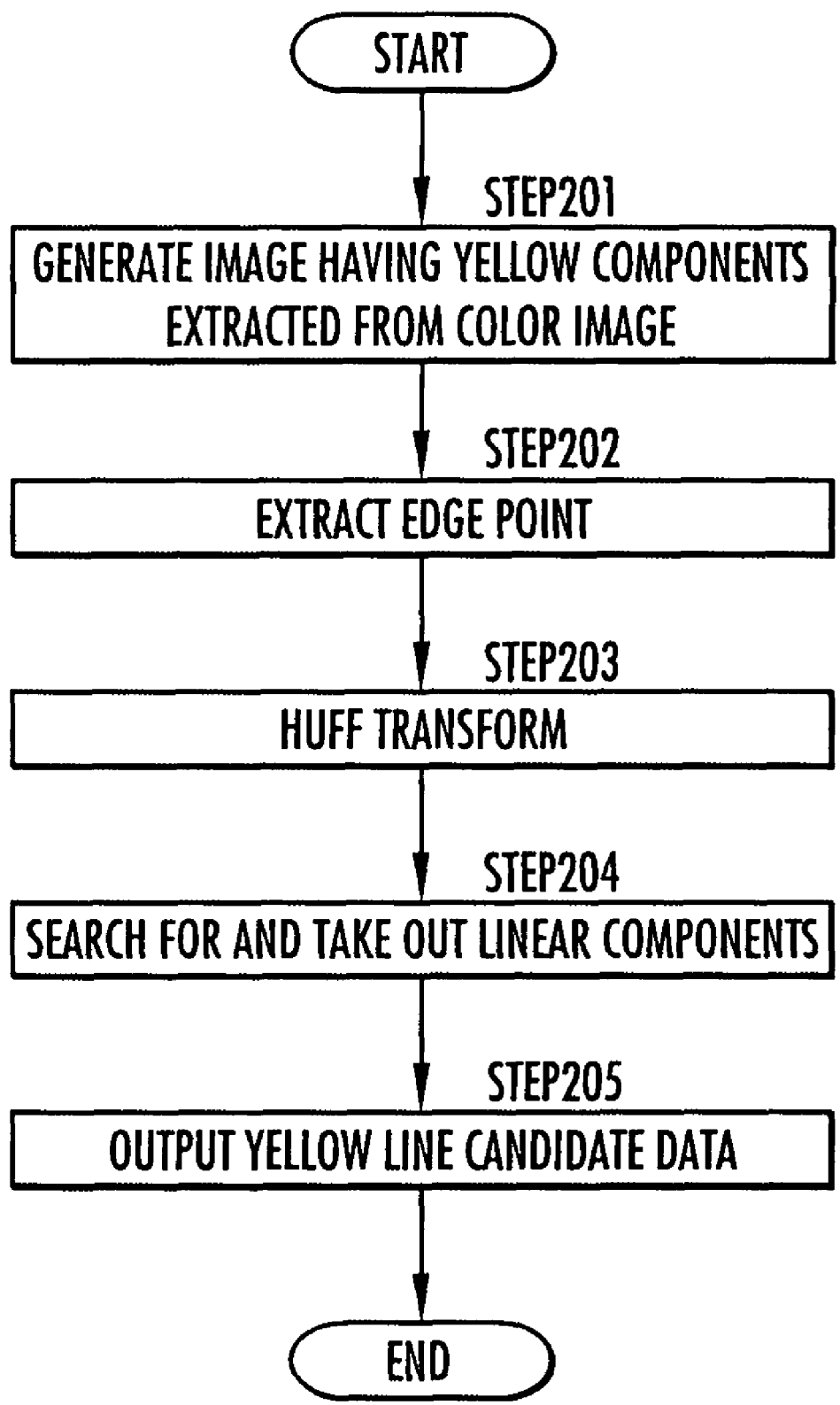
FIG. 4 It is a flowchart illustrating yellow line detection processing in the lane recognition processing of the lane recognition device in FIG. 1.
Figure 5:
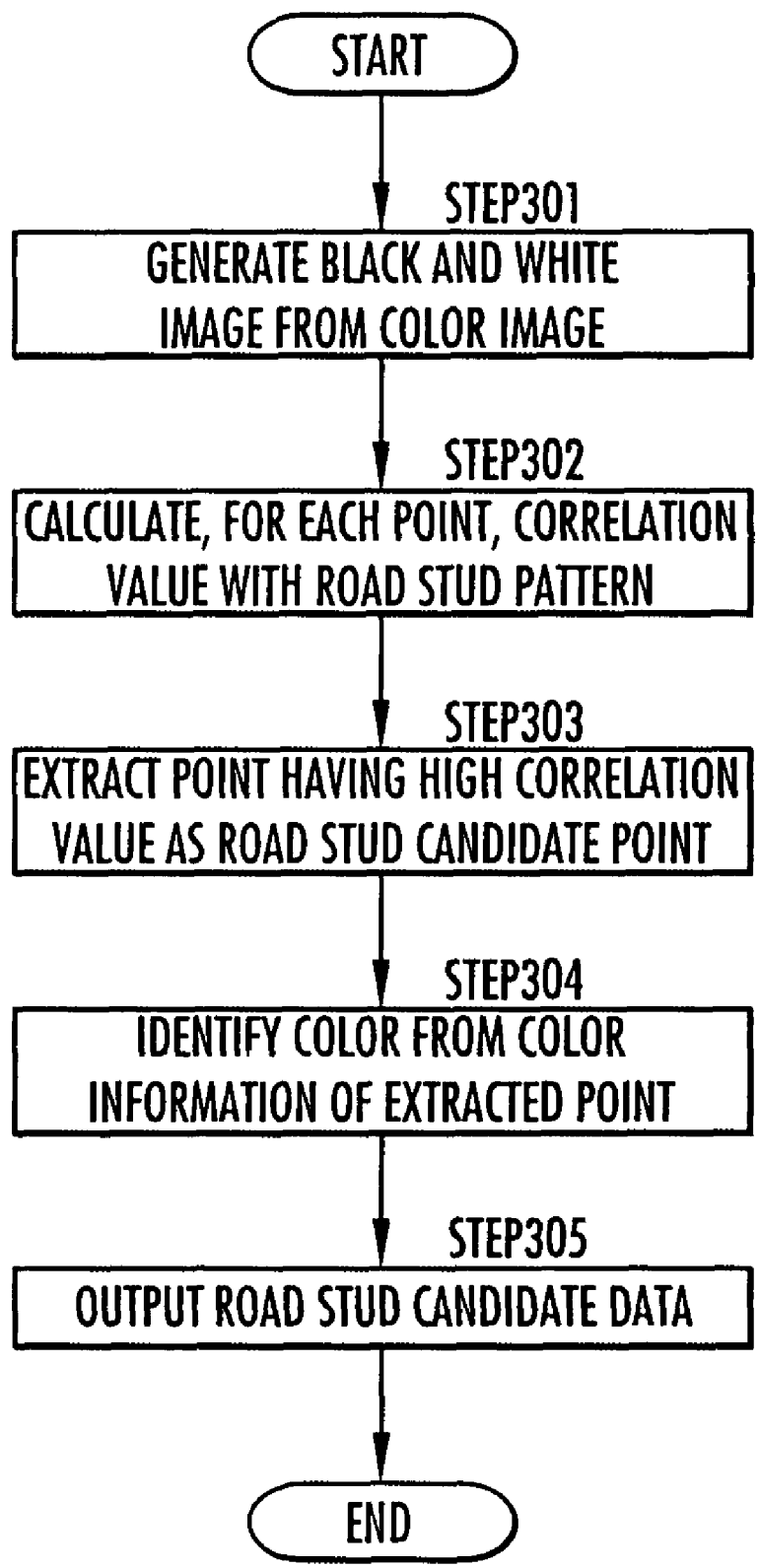
FIG. 5 It is a flowchart illustrating road stud detection processing in the lane recognition processing of the lane recognition device in FIG. 1.
Figure 6A:
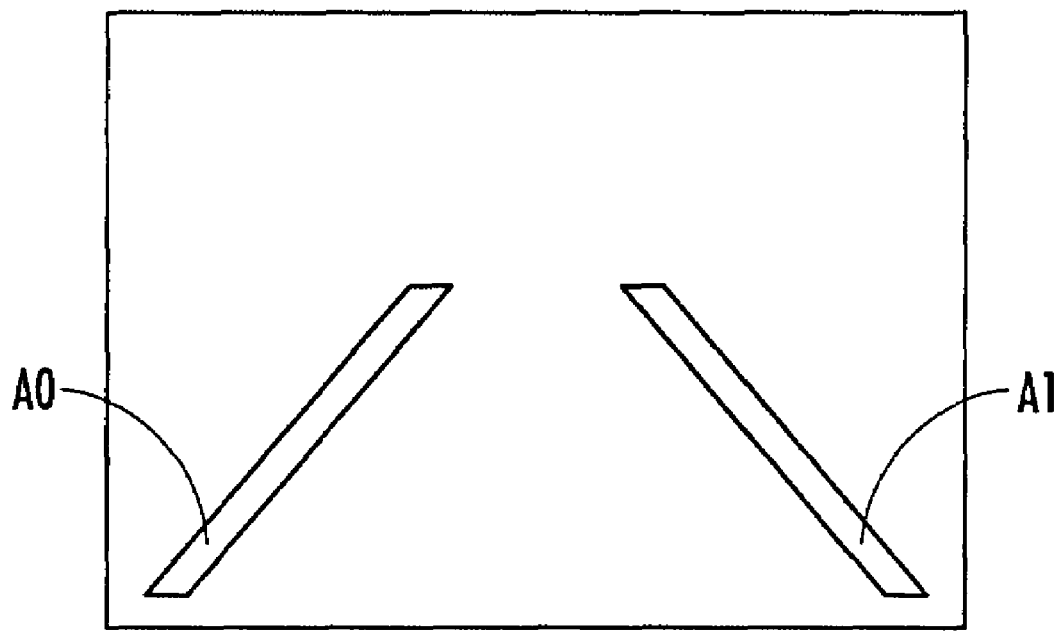
FIG. 6 It is a diagram showing examples of processed images in the lane recognition processing of the lane recognition device in FIG. 1.
Figure 6B:
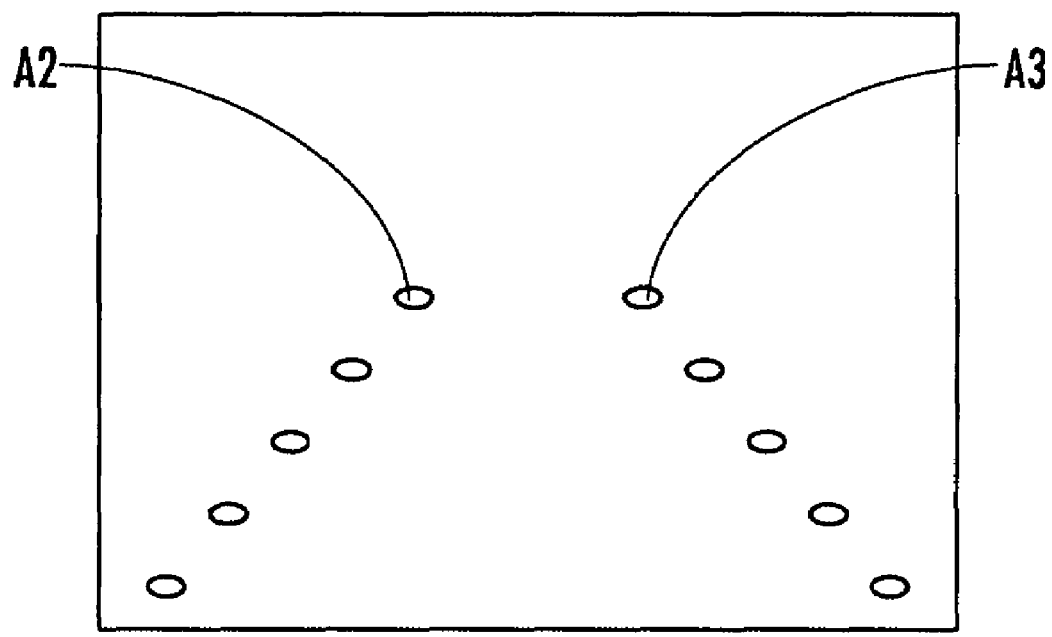

An embodiment of the present invention will now be described with reference to the accompanying drawings. FIG. 1 is a functional block diagram of a lane recognition device of the present embodiment. FIGS. 2-5 are flowcharts of lane recognition processing by the lane recognition device in FIG. 1. FIG. 6, (*a*) and (*b*), shows examples of processed images in the lane recognition processing by the lane recognition device in FIG. 1.

Referring to FIG. 1, the lane recognition device 1 is an electronic unit configured by a microcomputer or the like, and is mounted on a vehicle 8 while being provided with the following processing functions: an image acquisition means 2 for acquiring an image of a road; a white line detection means 3 for detecting a white line among the lane marks on the road from the acquired image; a yellow line detection means 4 for detecting a yellow line among the lane marks on the road from the acquired image; a road stud detection means 5 for detecting a road stud among the lane marks on the road from the acquired image; a selection means 6 for selecting, from the results of detection by the detection means 3, 4 and 5, the lane mark defining an actual lane on which the vehicle is traveling; and a meaning determination means 7 for determining the meaning of the selected lane mark. It is assumed in the present embodiment that the lane mark provided on the road is one of the white line, yellow line, and road stud. Further, the lane marks are classified into those of a line type (white line, yellow line), and those of a stud type (road stud).

The image acquisition means 2 acquires a color image I0 configured by pixel data from a video signal output from a color video camera 9 (CCD camera or the like; the imaging means of the present invention) that is attached to the front portion of the vehicle 8 and picks up an image of the road ahead of the vehicle 8. The pixel data has color components configured with R, G and B values. It is noted that provision of the color video camera 9 and the lane recognition device 1 implements the vehicle of the present invention.

The white line detection means 3 carries out the processing of detecting a white line from the color image I0 of the road acquired by the image acquisition means 2, and outputs the detection result as white line candidate data. The white line candidate data includes position data of the detected white line, color information, and type information. It is noted that in the white line candidate data, the color information is always "white" and the type information is always "line".

The yellow line detection means 4 carries out the processing of detecting a yellow line from the color image I0 of the road acquired by the image acquisition means 2, and outputs the detection result as yellow line candidate data. The yellow line candidate data includes position data of the detected yellow line, color information, and type information. It is noted that in the yellow line candidate data, the color information is always "yellow" and the type information is always "line".

The road stud detection means 5 carries out the processing of detecting a road stud (corresponding to the lane mark of a stud type of the present invention) from the color image I0 of the road acquired by the image acquisition means 2, and outputs the detection result as road stud candidate data. The road stud candidate data includes position data of the road stud, color information, and type information. It is noted that in the road stud candidate data, the type information is always "stud".

The selection means 6 selects lane mark candidate data corresponding to the lane mark defining the actual lane on which the vehicle 8 is traveling, from the white line candidate data output from the white line detection means 3, the yellow line candidate data output from the yellow line detection means 4, and the road stud candidate data output from the road stud detection means 5. Then, the selection means 6 determines and outputs lane data of the actual line on which the vehicle 8 is traveling, based on the selected lane mark candidate data. The lane data includes shape information of the actual lane on which the vehicle 8 is traveling, color information of the lane mark defining the lane, and type information of the lane mark defining the lane.

The meaning determination means 7 uses the color information and the type information included in the lane data output from the selection means 6 to determine the meaning (according to the road rules) of the lane mark defining the actual lane on which the vehicle 8 is traveling. The meaning determination means 7 then outputs the result of determination together with the lane data.

It is noted that the white line detection means 3 and the yellow line detection means 4 correspond to the lane mark detection means of the present invention.

Figure 2:
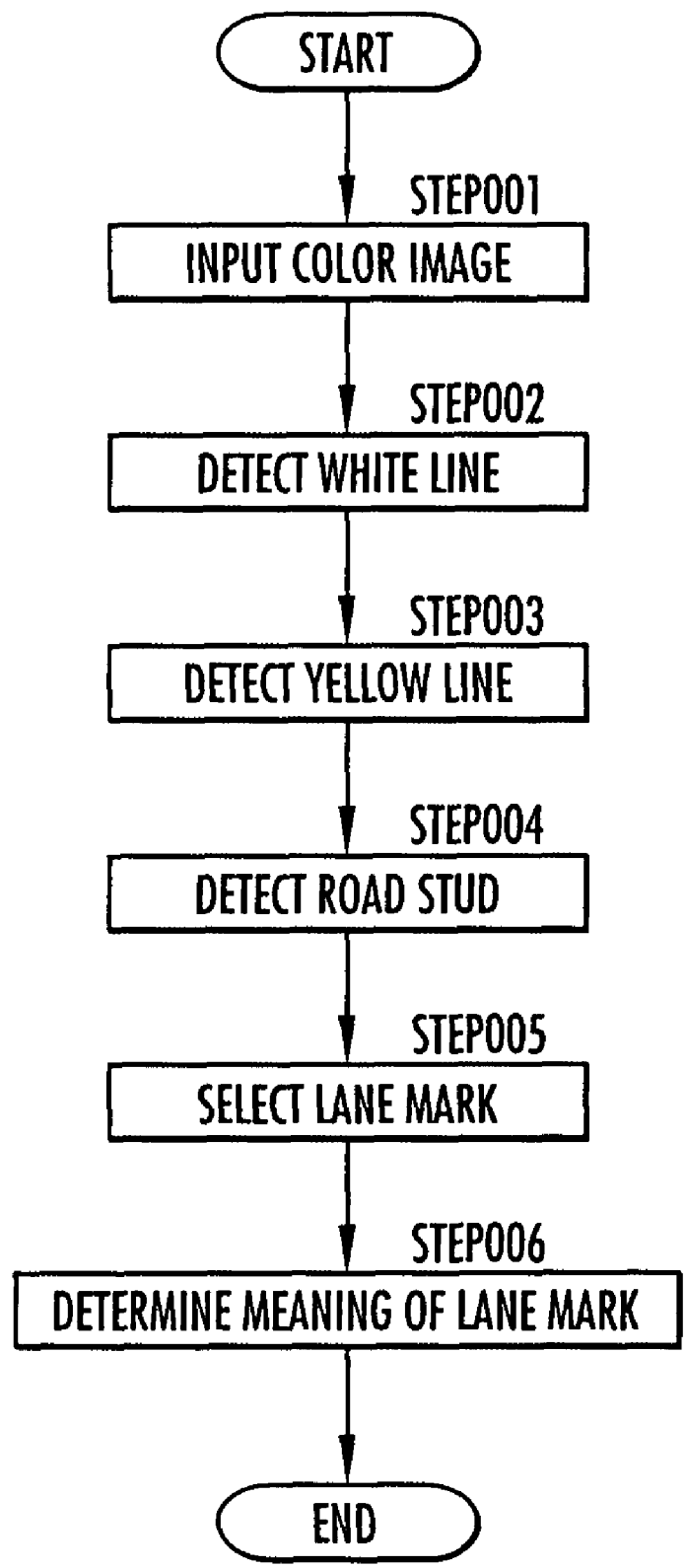
FIG. 2 It is a flowchart illustrating lane recognition processing of the lane recognition device in FIG. 1.
Figure 3:
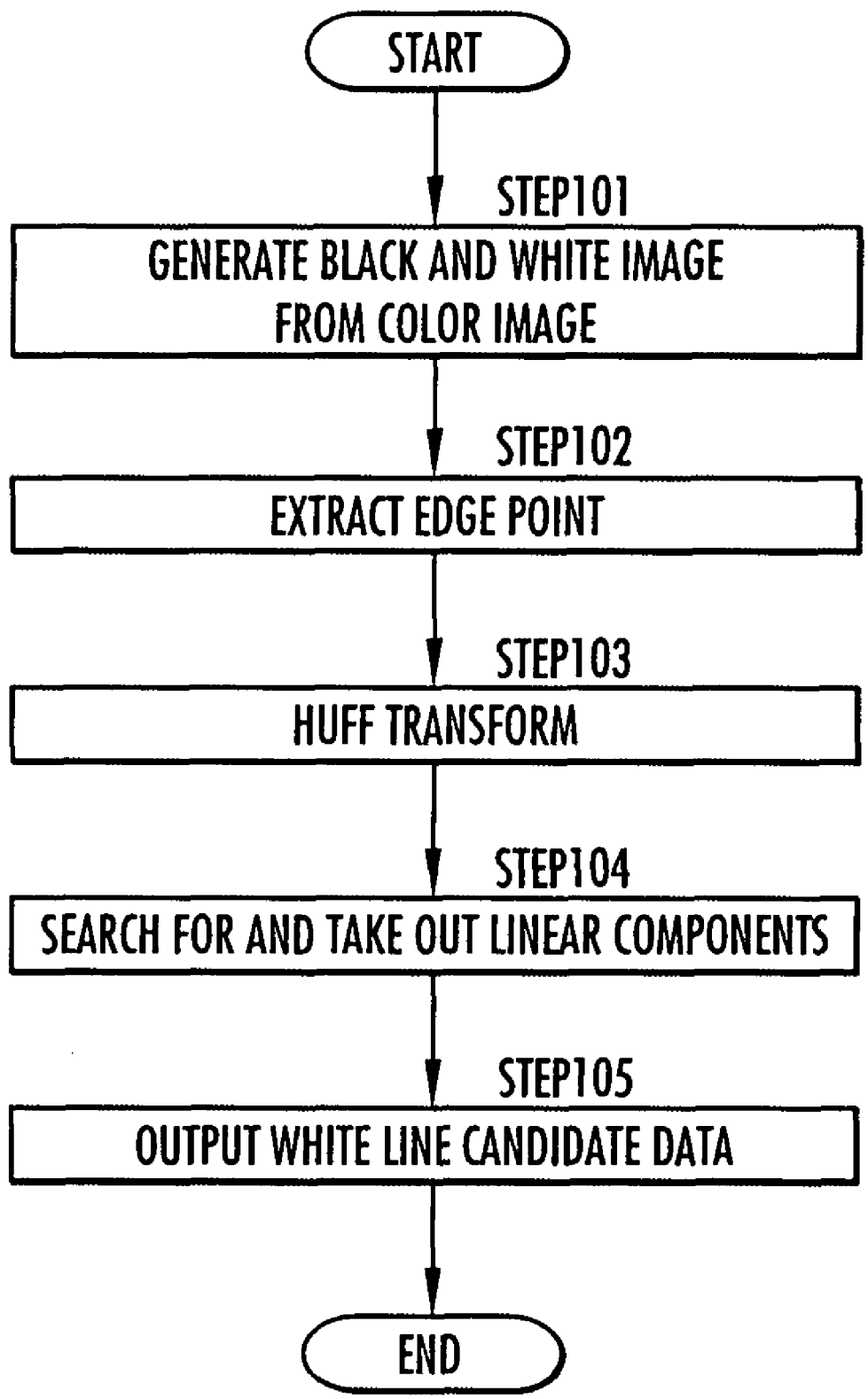
FIG. 3 It is a flowchart illustrating white line detection processing in the lane recognition processing of the lane recognition device in FIG. 1.

Hereinafter, an operation (lane recognition processing) of the lane recognition device 1 of the present embodiment will be described with reference to the flowcharts shown in FIGS. 2-5. FIG. 2 is a flowchart illustrating an overall operation of the lane recognition processing (main routine processing of the lane recognition device 1), FIG. 3 is a flowchart illustrating processing (sub-routine processing) of detecting a white line, FIG. 4 is a flowchart illustrating processing (sub-routine processing) of detecting a yellow line, and FIG. 5 is a flowchart illustrating processing (sub-routine processing) of detecting a road stud. It is noted that description will be made hereinbelow about the case, as shown in FIG. 6(*a*), where a white line A0 and a yellow line A1 define the left side and the right side, respectively, of the actual lane on which the vehicle 8 is traveling, and about the case, as shown in FIG. 6(*b*), where road studs A2 and A3 define the left side and the right side, respectively, of the actual lane on which the vehicle 8 is traveling.

Referring to FIG. 2, firstly, the image acquisition means 2 acquires a color image I0 of the road from a video signal output from the color video camera 9 (STEP 001). Here, the color image I0 is comprised of m×n pixels. Each pixel P0 of the color image I0 has data of R, G and B values as the color components. Hereinafter, the R value, G value and B value of each pixel P0($i,j$) will be represented as $R_{ij}$, $G_{ij}$ and $B_{ij}$ respectively, where i, j shows an address of the pixel, with integers satisfying $0 \leq i < m$ and $0 \leq j < n$.

Next, the white line detection means 3 carries out the processing of detecting a white line from the acquired color image I0 (STEP 002). The processing of detecting the white line is carried out as shown in FIG. 3. Firstly, the white line detection means 3 generates a black and white image I1 from the color image I0 (STEP 101). At this time, the white line detection means 3 generates the black and white image I1 comprised of m×n pixels and having, as data of each pixel P1($i,j$), a luminance value $Y_{ij}$ calculated from the R, G and B values ($R_{ij}$, $G_{ij}$, $B_{ij}$) of each pixel P0($i,j$) of the color image I0 by $Y_{ij} = \alpha \times R_{ij} + \beta \times G_{ij} + \gamma \times B_{ij}$. Here, α, β, and γ are predetermined coefficients satisfying $\alpha + \beta + \gamma = 1$.

Next, the white line detection means 3 extracts an edge point from the black and white image I1 (STEP 102). Next, it subjects the data, having the edge point extracted, to Huff transform (STEP 103). Next, the white line detection means 3 searches the Huff-transformed data to take out linear components (STEP 104). At this time, the linear components taken out include a plurality of linear components constituting the white line (i.e., corresponding to a portion of the white line).

Next, in STEP 105, the white line detection means 3 determines and outputs white line candidate data from the linear components taken out. The white line candidate data being output include left white line candidate data D_L1 corresponding to the candidate data for the lane mark defining the left side of the lane, and right white line candidate data D_R1 corresponding to the candidate data for the lane mark defining the right side of the lane. The left white line candidate data D_L1 includes: coordinate data P_L1 of a dot sequence corresponding to a plurality of points included in the white line that is a candidate of the lane mark defining the left side of the lane; color information of the white line; and type information of the white line. Similarly, the right white line candidate data D_R1 includes: coordinate data P_R1 of a dot sequence corresponding to a plurality of points included in the white line that is a candidate of the lane mark defining the right side of the lane; color information of the white line; and type information of the white line.

Here, the coordinate data P_L1 of the dot sequence in the left white line candidate data D_L1 is a set of the coordinate data P_L1 [L1] of the dot sequence corresponding to a plurality of points included in each of a plurality of (N_L1) linear components constituting the white line, collected for all of the plurality of linear components (where L1 in [ ] represents integers of L1=1 to N_L1). Similarly, the coordinate data P_R1 of the right white line candidate data D_R1 is a set of the coordinate data P_R1 [R1] of the dot sequence corresponding to a plurality of points included in each of a plurality of (N_R1) linear components constituting the white line, collected for all of the plurality of linear components (where R1 in [ ] represents integers of R1=1 to N_R1).

The left white line candidate data D_L1 is determined as follows. Firstly, the white line detection means 3 selects, from the linear components taken out, linear components included in the candidate of the lane mark defining the left side of the lane. At this time, N_L1 linear components are selected. Then, the white line detection means 3 sets coordinate data {(X1,Y1), (X2,Y2), . . . , (Xn,Yn)} for a plurality of (n) points included in each of the selected linear components as the coordinate data P_L1 [L1] of the dot sequence in the left white line candidate data D_L1. Further, the white line detection means 3 sets "white" as the color information and "line" as the type information of the left white line candidate data D_L1.

Next, the white line detection means 3 determines the right white line candidate data D_R1, similarly as in the case of the left white line candidate data D_L1. Firstly, the white line detection means 3 selects, from the linear components taken out, linear components included in a candidate of the lane mark defining the right side of the lane. At this time, N_R1 linear components are selected. Then, the white line detection means 3 sets coordinate data {(X1,Y1), (X2,Y2), . . . , (Xn, Yn)} for a plurality of (n) points included in each of the selected linear components as the coordinate data P_R1 [R1] of the dot sequence in the right white line candidate data D_R1. Further, the white line detection means 3 sets "white" as the color information and "line" as the type information of the right white line candidate data D_R1.

Through the processing in STEPS 101-105 described above, the white line is detected from the color image I0 with accuracy, and is output as the white line candidate data. For example, in the case shown in FIG. 6(*a*), the data of the white line A0 becomes the left white line candidate data D_L1.

Returning to FIG. 2, next, the yellow line detection means 4 carries out the processing of detecting a yellow line from the acquired color image I0 (STEP 003). The processing of detecting the yellow line is carried out as shown in FIG. 4. Firstly, the yellow line detection means 4 generates an image I2 having the yellow components extracted from the color image I0 (STEP 201). At this time, the yellow line detection means 4 generates the image I2 comprised of m×n pixels and having, as data of each pixel P2(*i*,*j*), a feature value $KY_{ij}$ calculated by $KY_{ij}=R_{ij}-B_{ij}$ using the R and B values ($R_{ij}$, $B_{ij}$) of the color components of each pixel P0(*i*,*j*) of the color image I0. Here, since the yellow color would likely have an R value of a high level and a B value of a low level, the difference between the R value and the B value, $R_{ij}-B_{ij}$, would express a significant characteristic of the yellow component. Therefore, with the feature values $KY_{ij}$ corresponding to the yellow color (yellow components), the image I2 is generated by appropriately extracting the yellow components.

Next, the yellow line detection means 4 extracts an edge point from the image I2 (STEP 202). Next, the yellow line detection means 4 subjects the image data, having the edge point extracted, to Huff transform (STEP 203). Then, the yellow line detection means 4 searches the Huff-transformed data to take out linear components (STEP 204). At this time, the linear components taken out include a plurality of linear components constituting the yellow line (i.e., corresponding to a portion of the yellow line).

Next, in STEP 205, the yellow line detection means 4 determines and outputs yellow line candidate data from the linear components taken out. The yellow line candidate data being output include left yellow line candidate data D_L2 corresponding to the candidate data for the lane mark defining the left side of the lane, and right yellow line candidate data D_R2 corresponding to the candidate data for the lane mark defining the right side of the lane. The left yellow line candidate data D_L2 has: coordinate data P_L2 of a dot sequence corresponding to a plurality of points included in the yellow line that is a candidate of the lane mark defining the left side of the lane; color information of the yellow line; and type information of the yellow line. Similarly, the right yellow line candidate data D_R2 has: coordinate data P_R2 of a dot sequence corresponding to a plurality of points included in the yellow line that is a candidate of the lane mark defining the right side of the lane; color information of the yellow line; and type information of the yellow line.

Further, the coordinate data P_L2 of the dot sequence in the left yellow line candidate data D_L2 is a set of the coordinate data P_L2 [L2] of the dot sequence corresponding to a plurality of points included in each of a plurality of (N_L2) linear components constituting the yellow line, collected for all of the plurality of linear components (where L2 in [ ] represents integers of L2=1 to N_L2). Similarly, the coordinate data P_R2 of the dot sequence in the right yellow line candidate data D_R2 is a set of the coordinate data P_R2 [R2] of the dot sequence corresponding to a plurality of points included in each of a plurality of (N_R2) linear components constituting the yellow line, collected for all of the plurality of linear components (where R2 in [ ] represents integers of R2=1 to N_R2).

The left yellow line candidate data D_L2 is determined as follows. Firstly, the yellow line detection means 4 selects, from the linear components taken out, linear components included in the candidate of the lane mark defining the left side of the lane. At this time, N_L2 linear components are selected. Then, the yellow line detection means 4 sets coordinate data {(X1,Y1), (X2,Y2), . . . , (Xn,Yn)} for a plurality of (n) points included in each of the selected linear components as the coordinate data P_L2 [L2] of the dot sequence in the left yellow line candidate data D_L2. Further, the yellow line detection means 4 sets "yellow" as the color information and "line" as the type information of the left yellow line candidate data D_L2.

Next, the yellow line detection means 4 determines the right yellow line candidate data D_R2, similarly as in the case of the left yellow line candidate data D_L2. Firstly, the yellow line detection means 4 selects, from the linear components taken out, linear components included in a candidate of the lane mark defining the right side of the lane. At this time, N_R2 linear components are selected. Then, the yellow line detection means 4 sets coordinate data {(X1,Y1), (X2,Y2), . . . , (Xn,Yn)} for a plurality of (n) points included in each of the selected linear components as the coordinate data P_R2 [R2] of the dot sequence in the right yellow line candidate data D_R2. Further, the yellow line detection means 4 sets "yellow" as the color information and "line" as the type information of each right yellow line candidate data D_R2 [R2].

Through the processing in STEPS 201-205 described above, the yellow line is detected from the color image I0 with accuracy, and is output as the yellow line candidate data. For example, in the case shown in FIG. 6(*a*), the data of the yellow line A1 becomes the right yellow line candidate data D_R2.

Returning to FIG. 2, next, the road stud detection means 5 carries out the processing of detecting a road stud from the acquired color image I0 (STEP 004). The processing of detecting the road stud is carried out as shown in FIG. 5. Firstly, the road stud detection means 5 generates a black and white image I3 from the color image I0 (STEP 301). At this time, similarly as in STEP 101 in the processing of detecting the white line in FIG. 3, the road stud detection means 5 generates the black and white image I3 comprised of m×n pixels and having, as data of each pixel P3(*i*,*j*), a luminance value $Y_{ij}$ calculated from the R, G and B values ($R_{ij}$, $G_{ij}$, $B_{ij}$) of each pixel P0(*i*,*j*) of the color image I0 by $Y_{ij}=\alpha \times R_{ij}+\beta \times G_{ij}+\gamma \times B_{ij}$.

Next, the road stud detection means 5 calculates, for each point in the black and white image I3, a correlation value with a road stud pattern (reference shape for pattern matching) stored in advance (STEP 302). Specifically, the road stud detection means 5 calculates a correlation value between the pattern within a predetermined area centered at each point and the road stud pattern. Next, the road stud detection means 5 extracts a point having the high correlation value as a road stud candidate point (STEP 303). The extracted road stud candidate point indicates the central point of the road stud. It is noted that, for the specific method for pattern matching, the conventional method as described in Patent Document 1 mentioned above may be used. Next, the road stud detection means 5 specifies the color information of the extracted road stud candidate point from the R, G and B values ($R_{ij}$, $G_{ij}$, $B_{ij}$) of the pixel P0(*i*,*j*) in the color image I0 that corresponds to the pixel P3(*i*,*j*) of the extracted road stud candidate point.

Next, in STEP 305, the road stud detection means 5 determines and outputs road stud candidate data. The road stud candidate data being output include left road stud candidate data D_L3 corresponding to the candidate data for the lane mark defining the left side of the lane, and right road stud candidate data D_R3 corresponding to the candidate data for the lane mark defining the right side of the lane. The left road stud candidate data D_L3 has: coordinate data P_L3 of road stud candidate points corresponding to a plurality of road studs as the candidate of the lane mark defining the left side of the lane; color information of the road studs; and type information of the road studs. Similarly, the right road stud candidate data D_R3 has: coordinate data P_R3 of the points corresponding to a plurality of road studs as the candidate of the lane mark defining the right side of the lane; color information of the road studs; and type information of the road studs. It is noted that, in the present embodiment, the road studs in the U.S.A. are assumed, in which case the colors of the road studs as seen from the vehicle may be classified into "red", "yellow" and "others".

The left road stud candidate data D_L3 is determined as follows. Firstly, the road stud detection means 5 selects, from the extracted road stud candidate points, a plurality of (n) road stud candidate points to be the candidate of the lane mark defining the left side of the lane. Then, the road stud detection means 5 sets the coordinate data {(X1,Y1), (X2,Y2), ..., (Xn,Yn)} of the selected n road stud candidate points as the coordinate data P_L3 of the dot sequence in the left road stud candidate data D_L3. Further, the road stud detection means 5 classifies the color into "yellow", "red" or "others" in accordance with the color information of the selected n road stud candidate points, and sets the color "yellow", "red" or "others" obtained by the classification as the color information of each left road stud candidate data D_L3. Further, it sets "stud" as the type information.

Next, the road stud detection means 5 determines the right road stud candidate data D_R3, similarly as in the case of the left road stud candidate data D_L3. Firstly, the road stud detection means 5 selects, from the extracted road stud candidate points, a plurality of (n) road stud candidate points as the candidate of the lane mark defining the right side of the lane. Then, the road stud detection means 5 sets coordinate data {(X1,Y1), (X2,Y2), ..., (Xn,Yn)} of the selected n road stud candidate points as the coordinate data P_R3 of the dot sequence in the right road stud candidate data D_R3. Further, it classifies the color into "yellow", "red" or "others" in accordance with the color information of the selected n road stud candidate points, and sets the color "yellow", "red" or "others" obtained by the classification as the color information of each right road stud candidate data D_R3. Further, the road stud detection means 5 sets "stud" as the type information.

Through the processing in STEPS 301-305 described above, the road studs can be detected from the color image I0 with accuracy, and output as the road stud candidate data. For example, in the case shown in FIG. 6(*b*), the data of the road studs A2 becomes the left road stud candidate data D_L3, and the data of the road studs A3 becomes the right road stud candidate data D_R3.

Next, returning to FIG. 2, the selection means 6 selects lane mark candidate data corresponding to the data of the lane mark defining the actual lane on which the vehicle 8 is traveling from the white line candidate data output from the white line detection means 3, the yellow line candidate data output from the yellow line detection means 4, and the road stud candidate data output from the road stud detection means 5, and determines and outputs lane data of the actual lane on which the vehicle 8 is traveling (STEP 005). The lane data being output includes: left shape information indicating the shape of the left side line defining the left side of the actual lane on which the vehicle 8 is traveling; left color information indicating the color of the lane mark defining the left side line; left type information indicating the type of the lane mark defining the left side line; right shape information indicating the shape of the right side line defining the right side of the actual lane on which the vehicle 8 is traveling; right color information indicating the color of the lane mark defining the right side line; and right type information indicating the type of the lane mark defining the right side line.

Firstly, for the left white line candidate data D_L1, the left yellow line candidate data D_L2 and the left road stud candidate data D_L3, the selection means 6 uses the coordinate data P_L1, P_L2 and P_L3 of the respective dot sequences to obtain a quadratic approximating respective one of the dot sequences. At this time, a least-squares method is used as the approximation method. Next, the selection means 6 obtains, for each of the coordinate data of the dot sequences, a determination coefficient that is a coefficient indicating the degree of approximation of the relevant data with the obtained quadratic. Next, the selection means 6 selects one of the left white line candidate data D_L1, the left yellow line candidate data D_L2 and the left road stud candidate data D_L3 having the highest determination coefficient, as lane mark candidate data D_L4 corresponding to the lane mark defining the actual left side line. For example, in the case shown in FIG. 6(*a*), the left white line candidate data D_L1 (the data indicating the white line A0) is selected as the lane mark candidate data D_L4. Further, in the case shown in FIG. 6(*b*), the left road stud candidate data D_L3 (the data indicating the road stud A2) is selected as the lane mark candidate data D_L4. In this manner, it is possible to appropriately select the lane mark candidate data D_L4.

Next, for the right white line candidate data D_R1, the right yellow line candidate data D_R2 and the right road stud candidate data D_R3, the selection means 6 uses the coordinate data P_R1, P_R2 and P_R3 of the respective dot sequences to obtain a quadratic approximating respective one of the dot sequences. At this time, the least-squares method is used for the approximation method. Next, the selection means 6 obtains, from the coordinate data of the respective dot sequences and the obtained quadratics, a determination coefficient for respective one of them. Next, the selection means 6 selects one of the right white line candidate data D_R1, the right yellow line candidate data D_R2 and the right road stud candidate data D_R3 having the highest determination coefficient, as lane mark candidate data D_R4 corresponding to the lane mark defining the actual right side line. For example, in the case shown in FIG. 6(*a*), the right yellow line candidate data D_R2 (the data indicating the yellow line A1) is selected as the lane mark candidate data D_R4. Further, in the case shown in FIG. 6(*b*), the right road stud candidate data D_R3 (the data indicating the road stud A3) is selected as the lane mark candidate data D_R4. In this manner, it is possible to appropriately select the lane mark candidate data D_R4.

Next, the selection means 6 determines and outputs lane data from the selected lane mark candidate data D_L4 and D_R4. Firstly, the selection means 6 sets the quadratic approximating the dot sequence of the lane mark candidate data D_L4 as the left shape information, and sets the quadratic approximating the dot sequence of the lane mark candidate data D_R4 as the right shape information. In this manner, it is possible to accurately determine the shape information of the actual lane on which the vehicle 8 is traveling, by utilizing the quadratics calculated when selecting the lane mark candidates D_L4 and D_R4.

Next, the selection means 6 sets the color information of the lane mark candidate data D_L4 as the left color information, and sets the type information of the lane mark candidate data D_L4 as the left type information. Further, the selection means 6 sets the color information of the lane mark candidate data D_R4 as the right color information, and sets the type information of the lane mark candidate data D_R4 as the right type information. Then, the selection means 6 outputs the determined lane data. In this manner, the color information and the type information of the lane marks defining the left and right side lines are obtained in addition to the shape information of the left and right side lines, and they are output as the lane data.

Next, the meaning determination means 7 carries out the processing of determining the meaning of each lane mark defining the actual lane on which the vehicle 8 is traveling, by using the left color information, the right color information, the left type information, and the right type information in the lane data output from the selection means 6, and outputs the result of the processing as additional information, together with the lane data (STEP 006). The additional information being output includes: left additional information as a result of determination of the meaning of the lane mark defining the left side line; and right additional information as a result of determination of the meaning of the lane mark defining the right side line.

The meaning determination means 7 determines the meanings of the above-described lane marks based on the determination data stored in advance, and sets the results of determination as the left additional information and the right additional information. The determination data is prepared in accordance with the combination of the left color information, right color information, left type information, and right type information.

For example, in the U.S.A., in the case where a vehicle is traveling in a wrong direction (opposite the correct direction) on the road provided with the road studs as the lane marks, the road studs are seen red from the vehicle side. Thus, in the case where the left type information is "stud" and the left color information is "red", and in the case where the right type information is "stud" and the right color information is "red", it is determined that the vehicle 8 is traveling on the road in the wrong direction, and "traveling the wrong way" is set for the left and right additional information. Further, in the case where the left type information is "line" or "stud" and the left color information is "yellow", it is determined that passing of the left side line is prohibited, and thus, "do not pass" is set for the left additional information. Further, in the case where the right type information is "line" or "stud" and the right color information is "yellow", it is determined that passing of the right side line is prohibited, and thus, "do not pass" is set for the right additional information. Furthermore, in the case where the left color information is "white" or "others" and the right color information is "white" or "others", nothing is set for the left or right additional information.

For example, in the case shown in FIG. 6(*a*), "do not pass" is set for the left right additional information, and nothing is set for the left additional information. In the case shown in FIG. 6(*b*), "traveling the wrong way" is set for both of the left and right additional information. In this manner, it is possible to appropriately determine the meaning in the road rules of the lane mark defining the actual lane on which the vehicle 8 is traveling, and to use the output result of determination for control of the vehicle 8 or notification to the driver in accordance with the meaning of the lane mark.

Through the processing described above, the lane marks of different colors can be recognized appropriately from the color image of the road. Accordingly, even in the case where there are lane marks of a plurality of colors on the road, it is possible to appropriately recognize the actual lane on which the vehicle 8 is traveling.

While the present embodiment is provided with the meaning determination means 6, it is possible to not provide the meaning determination means 7, in which case the lane data output from the selection means 7 may be used as it is for control of the vehicle 8 or for notification to the driver.

Further, while the road stud detection means 5 is provided in the present embodiment, it is possible to not provide the road stud detection means 5, in which case the selection means 6 may select the data of the lane mark from among the lane mark candidate data output from the white line detection means 3 and the yellow line detection means 4.

Furthermore, while the road studs A2, A3 are detected based on the shape pattern by the road stud detection means 5 in the present embodiment, for example in the case where the road studs A2, A3 are applied with distinctive colors, the color information corresponding to the distinctive colors may be used in addition to the shape pattern, or only the color information corresponding to the distinctive colors may be used, for detection of the road studs A2, A3.

Still further, while the lane mark detection means 3, 4 detect the white and yellow lane marks in the present embodiment, in the case where a lane mark of another color is to be detected, it is possible to provide lane mark detection means that detects a lane mark based on the color information corresponding to the other color.

INDUSTRIAL APPLICABILITY

As described above, the present invention is capable of processing a color image of the road ahead of the vehicle to appropriately recognize lane marks of different colors, and therefore, it is useful for presentation of information to the driver of the vehicle or for control of the behavior of the vehicle.

The invention claimed is:

1. A vehicle comprising:
    an imaging means;
    an image acquisition means for acquiring a color image of a road via the imaging means;
    a lane mark detection means for performing processing of detecting lane marks of a plurality of predetermined colors different from each other on the road based on color information of the color image, and outputting a result of the processing as lane mark candidate data; and
    a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data,
    wherein
        each of the lane mark candidate data has lane mark position data indicating a position of the lane mark, color information of the lane mark, and type information of the lane mark,
        the lane data output by the selection means has shape information of the actual lane, color information of the lane mark defining the actual lane, and type information of the lane mark defining the actual lane, and the selection means determines the shape information in the lane data based on the lane mark position data in the selected lane mark candidate data, determines the color information in the lane data based on the color information in the selected lane mark candidate data, and determines the type information in the lane data based on the type information in the selected lane mark candidate data.

2. The vehicle according to claim 1, further comprising a road stud detection means for performing processing of detecting a lane mark of a stud type on the road on which the vehicle is traveling from the color image based on a shape pattern of the lane mark of the stud type, and outputting a result of the processing as lane mark candidate data, wherein
the selection means selects the lane mark candidate data corresponding to the lane mark defining the actual lane on which the vehicle is traveling from among the lane mark candidate data for the respective predetermined colors output from the lane mark detection means and the lane mark candidate data output from the road stud detection means.

3. The vehicle according to claim 1, comprising a meaning determination means for performing processing of determining a meaning of the lane mark defining the lane based on the color information and the type information in the lane data output by the selection means, and outputting a result of the processing together with the lane data.

4. The vehicle according to claim 1, wherein
the lane mark position data in each of the lane mark candidate data is comprised of coordinate data of a dot sequence indicating a route of the lane mark, and
the selection means obtains, for each of the lane mark candidate data, a polynomial of predetermined degree of at least second degree approximating the dot sequence based on the coordinate data of the dot sequence, and calculates a determination coefficient that is a coefficient indicating a degree of approximation of the dot sequence by the polynomial, to select the lane mark candidate data having the highest determination coefficient as the lane mark candidate data corresponding to the lane mark defining the actual lane.

5. The vehicle according to claim 4, wherein the selection means determines the shape information in the lane data based on the polynomial approximating the dot sequence of the selected lane mark candidate data.

6. The vehicle according to claim 1, wherein
each of the lane mark candidate data is comprised of left lane mark candidate data that is candidate data for a lane mark defining a left side of the lane and right lane mark candidate data that is candidate data for a lane mark defining a right side of the lane, the left lane mark candidate data having lane mark position data indicating a position of the lane mark defining the left side of the lane, color information of the lane mark, and type information of the lane mark, and the right lane mark candidate data having lane mark position data indicating a position of the lane mark defining the right side of the lane, color information of the lane mark, and type information of the lane mark,
the lane data output by the selection means has left shape information that is shape information of a left side line defining a left side of the actual lane, left color information that is color information of the lane mark defining the left side line, left type information that is type information of the lane mark defining the left side line, right shape information that is shape information of a right side line defining a right side of the actual lane, right color information that is color information of the lane mark defining the right side line, and right type information that is type information of the lane mark defining the right side line, and
the selection means selects the left lane mark candidate data corresponding to the lane mark defining the left side of the actual lane from among the left lane mark candidate data, and selects the right lane mark candidate data corresponding to the lane mark defining the right side of the actual lane from among the right lane mark candidate data, determines the left shape information in the lane data based on the lane mark position data in the selected left lane mark candidate data, determines the left color information in the lane data based on the color information in the selected left lane mark candidate data, and determines the left type information in the lane data based on the type information in the selected left lane mark candidate data, and also determines the right shape information in the lane data based on the lane mark position data in the selected right lane mark candidate data, determines the right color information in the lane data based on the color information in the selected right lane mark candidate data, and determines the right type information in the lane data based on the type information in the selected right lane mark candidate data.

7. The vehicle according to claim 6, comprising meaning determination means for performing processing of determining meanings of the lane marks defining the left side line and the right side line based on the left color information, the right color information, the left type information, and the right type information in the lane data output by the selection means, and outputting a result of the processing together with the lane data.

8. The vehicle according to claim 6, wherein
the lane mark position data in each of the left lane mark candidate data is comprised of coordinate data of a left dot sequence that is a dot sequence indicating a route of the lane mark defining the left side of the lane, and the lane mark position data in each of the right lane mark candidate data is comprised of coordinate data of a right dot sequence that is a dot sequence indicating a route of the lane mark defining the right side of the lane, and
the selection means obtains, for each of the left lane mark candidate data, a polynomial of predetermined degree of at least second degree approximating the left dot sequence based on the coordinate data of the left dot sequence, and calculates a determination coefficient that is a coefficient indicating a degree of approximation of the left dot sequence by the polynomial, to select the left lane mark candidate data having the highest determination coefficient as the left lane mark candidate data corresponding to the lane mark defining the left side of the actual lane, and also obtains, for each of the right lane mark candidate data, a polynomial of predetermined degree of at least second degree approximating the right dot sequence based on the coordinate data of the right dot sequence, and calculates a determination coefficient that is a coefficient indicating a degree of approximation of the right dot sequence by the polynomial, to select the right lane mark candidate data having the highest determination coefficient as the right lane mark candidate data corresponding to the lane mark defining the right side of the actual lane.

9. The vehicle according to claim 8, wherein the selection means determines the left shape information in the lane data based on the polynomial approximating the left dot sequence of the selected left lane mark candidate data, and determines the right shape information in the lane data based on the polynomial approximating the right dot sequence of the selected right lane mark candidate data.

10. A lane recognition device comprising:
- an image acquisition means for acquiring a color image of a road via an imaging means mounted on a vehicle;
- a lane mark detection means for performing processing of detecting lane marks of a plurality of predetermined colors different from each other on the road based on color information of the color image, and outputting a result of the processing as lane mark candidate data; and
- a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data, wherein
- each of the lane mark candidate data has lane mark position data indicating a position of the lane mark, color information of the lane mark, and type information of the lane mark,
- the lane data output by the selection means has shape information of the actual lane, color information of the lane mark defining the actual lane, and type information of the lane mark defining the actual lane, and
- the selection means determines the shape information in the lane data based on the lane mark position data in the selected lane mark candidate data, determines the color information in the lane data based on the color information in the selected lane mark candidate data, and determines the type information in the lane data based on the type information in the selected lane mark candidate data.

11. The lane recognition device according to claim 10, further comprising a road stud detection means for performing processing of detecting a lane mark of a stud type on the road on which the vehicle is traveling from the color image based on a shape pattern of the lane mark of the stud type, and outputting a result of the processing as lane mark candidate data, wherein
- the selection means selects the lane mark candidate data corresponding to the lane mark defining the actual lane on which the vehicle is traveling from among the lane mark candidate data for the respective predetermined colors output from the lane mark detection means and the lane mark candidate data output from the road stud detection means.

12. The lane recognition device according to claim 10, comprising a meaning determination means for performing processing of determining a meaning of the lane mark defining the lane based on the color information and the type information in the lane data output by the selection means, and outputting a result of the processing together with the lane data.

13. The lane recognition device according to claim 10, wherein the lane mark position data in each of the lane mark candidate data is comprised of coordinate data of a dot sequence indicating a route of the lane mark, and
- the selection means obtains, for each of the lane mark candidate data, a polynomial of predetermined degree of at least second degree approximating the dot sequence based on the coordinate data of the dot sequence, and calculates a determination coefficient that is a coefficient indicating a degree of approximation of the dot sequence by the polynomial, to select the lane mark candidate data having the highest determination coefficient as the lane mark candidate data corresponding to the lane mark defining the actual lane.

14. The lane recognition device according to claim 13, wherein the selection means determines the shape information in the lane data based on the polynomial approximating the dot sequence of the selected lane mark candidate data.

15. The lane recognition device according to claim 10, wherein
- each of the lane mark candidate data is comprised of left lane mark candidate data that is candidate data for a lane mark defining a left side of the lane and right lane mark candidate data that is candidate data for a lane mark defining a right side of the lane, the left lane mark candidate data having lane mark position data indicating a position of the lane mark defining the left side of the lane, color information of the lane mark, and type information of the lane mark, and the right lane mark candidate data having lane mark position data indicating a position of the lane mark defining the right side of the lane, color information of the lane mark, and type information of the lane mark,
- the lane data output by the selection means has left shape information that is shape information of a left side line defining a left side of the actual lane, left color information that is color information of the lane mark defining the left side line, left type information that is type information of the lane mark defining the left side line, right shape information that is shape information of a right side line defining a right side of the actual lane, right color information that is color information of the lane mark defining the right side line, and right type information that is type information of the lane mark defining the right side line, and
- the selection means selects the left lane mark candidate data corresponding to the lane mark defining the left side of the actual lane from among the left lane mark candidate data, and selects the right lane mark candidate data corresponding to the lane mark defining the right side of the actual lane from among the right lane mark candidate data, determines the left shape information in the lane data based on the lane mark position data in the selected left lane mark candidate data, determines the left color information in the lane data based on the color information in the selected left lane mark candidate data, and determines the left type information in the lane data based on the type information in the selected left lane mark candidate data, and also determines the right shape information in the lane data based on the lane mark position data in the selected right lane mark candidate data, determines the right color information in the lane data based on the color information in the selected right lane mark candidate data, and determines the right type information in the lane data based on the type information in the selected right lane mark candidate data.

16. The lane recognition device according to claim 15, comprising meaning determination means for performing processing of determining meanings of the lane marks defining the left side line and the right side line based on the left color information, the right color information, the left type information, and the right type information in the lane data output by the selection means, and outputting a result of the processing together with the lane data.

17. The lane recognition device according to claim 15, wherein the lane mark position data in each of the left lane mark candidate data is comprised of coordinate data of a left dot sequence that is a dot sequence indicating a route of the lane mark defining the left side of the lane, and the lane mark position data in each of the right lane mark candidate data is comprised of coordinate data of a right dot sequence that is a dot sequence indicating a route of the lane mark defining the right side of the lane, and the selection means obtains, for each of the left lane mark candidate data, a polynomial of predetermined degree of at least second degree approximating the left dot sequence based on the coordinate data of the left dot sequence, and calculates a determination coefficient that is a coefficient indicating a degree of approximation of the left dot sequence by the polynomial, to select the left lane mark candidate data having the highest determination coefficient as the left lane mark candidate data corresponding to the lane mark defining the left side of the actual lane, and also obtains, for each of the right lane mark candidate data, a polynomial of predetermined degree of at least second degree approximating the right dot sequence based on the coordinate data of the right dot sequence, and calculates a determination coefficient that is a coefficient indicating a degree of approximation of the right dot sequence by the polynomial, to select the right lane mark candidate data having the highest determination coefficient as the right lane mark candidate data corresponding to the lane mark defining the right side of the actual lane.

18. The lane recognition device according to claim 17, wherein the selection means determines the left shape information in the lane data based on the polynomial approximating the left dot sequence of the selected left lane mark candidate data, and determines the right shape information in the lane data based on the polynomial approximating the right dot sequence of the selected right lane mark candidate data.

19. A vehicle comprising:
an imaging means;
an image acquisition means for acquiring a color image of a road via the imaging means;
a lane mark detection means for performing processing of detecting lane marks of a plurality of predetermined colors different from each other on the road based on color information of the color image, and outputting a result of the processing as lane mark candidate data;
a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data; and
a road stud detection means for performing processing of detecting a lane mark of a stud type on the road on which the vehicle is traveling from the color image based on a shape pattern of the lane mark of the stud type, and outputting a result of the processing as lane mark candidate data, wherein
the selection means selects the lane mark candidate data corresponding to the lane mark defining the actual lane on which the vehicle is traveling from among the lane mark candidate data for the respective predetermined colors output from the lane mark detection means and the lane mark candidate data output from the road stud detection means.

20. The vehicle according to claim 19, wherein
each of the lane mark candidate data has lane mark position data indicating a position of the lane mark, color information of the lane mark, and type information of the lane mark,
the lane data output by the selection means has shape information of the actual lane, color information of the lane mark defining the actual lane, and type information of the lane mark defining the actual lane, and
the selection means determines the shape information in the lane data based on the lane mark position data in the selected lane mark candidate data, determines the color information in the lane data based on the color information in the selected lane mark candidate data, and determines the type information in the lane data based on the type information in the selected lane mark candidate data.

21. The vehicle according to claim 20, comprising a meaning determination means for performing processing of determining a meaning of the lane mark defining the lane based on the color information and the type information in the lane data output by the selection means, and outputting a result of the processing together with the lane data.

22. The vehicle according to claim 20, wherein
the lane mark position data in each of the lane mark candidate data is comprised of coordinate data of a dot sequence indicating a route of the lane mark, and
the selection means obtains, for each of the lane mark candidate data, a polynomial of predetermined degree of at least second degree approximating the dot sequence based on the coordinate data of the dot sequence, and calculates a determination coefficient that is a coefficient indicating a degree of approximation of the dot sequence by the polynomial, to select the lane mark candidate data having the highest determination coefficient as the lane mark candidate data corresponding to the lane mark defining the actual lane.

23. The vehicle according to claim 22, wherein the selection means determines the shape information in the lane data based on the polynomial approximating the dot sequence of the selected lane mark candidate data.

24. The vehicle according to claim 19, wherein
each of the lane mark candidate data is comprised of left lane mark candidate data that is candidate data for a lane mark defining a left side of the lane and right lane mark candidate data that is candidate data for a lane mark defining a right side of the lane, the left lane mark candidate data having lane mark position data indicating a position of the lane mark defining the left side of the lane, color information of the lane mark, and type information of the lane mark, and the right lane mark candidate data having lane mark position data indicating a position of the lane mark defining the right side of the lane, color information of the lane mark, and type information of the lane mark,
the lane data output by the selection means has left shape information that is shape information of a left side line defining a left side of the actual lane, left color information that is color information of the lane mark defining the left side line, left type information that is type information of the lane mark defining the left side line, right shape information that is shape information of a right side line defining a right side of the actual lane, right color information that is color information of the lane mark defining the right side line, and right type information that is type information of the lane mark defining the right side line, and the selection means selects the left lane mark candidate data corresponding to the lane mark defining the left side of the actual lane from among the left lane mark candidate data, and selects the right lane mark candidate data corresponding to the lane mark defining the right side of the actual lane from among the right lane mark candidate data, determines the left shape information in the lane data based on the lane mark position data in the selected left lane mark candidate data, determines the left color information in the lane data based on the color information in the selected left lane mark candidate data, and determines the left type information in the lane data based on the type information in the selected left lane mark candidate data, and also determines the right shape information in the lane data based on the lane mark position data in the selected right lane mark candidate data, determines the right color information in the lane data based on the color information in the selected right lane mark candidate data, and determines the right type information in the lane data based on the type information in the selected right lane mark candidate data.

25. The vehicle according to claim 24, comprising meaning determination means for performing processing of determining meanings of the lane marks defining the left side line and the right side line based on the left color information, the right color information, the left type information, and the right type information in the lane data output by the selection means, and outputting a result of the processing together with the lane data.

26. The vehicle according to claim 24, wherein
the lane mark position data in each of the left lane mark candidate data is comprised of coordinate data of a left dot sequence that is a dot sequence indicating a route of the lane mark defining the left side of the lane, and the lane mark position data in each of the right lane mark candidate data is comprised of coordinate data of a right dot sequence that is a dot sequence indicating a route of the lane mark defining the right side of the lane, and
the selection means obtains, for each of the left lane mark candidate data, a polynomial of predetermined degree of at least second degree approximating the left dot sequence based on the coordinate data of the left dot sequence, and calculates a determination coefficient that is a coefficient indicating a degree of approximation of the left dot sequence by the polynomial, to select the left lane mark candidate data having the highest determination coefficient as the left lane mark candidate data corresponding to the lane mark defining the left side of the actual lane, and also obtains, for each of the right lane mark candidate data, a polynomial of predetermined degree of at least second degree approximating the right dot sequence based on the coordinate data of the right dot sequence, and calculates a determination coefficient that is a coefficient indicating a degree of approximation of the right dot sequence by the polynomial, to select the right lane mark candidate data having the highest determination coefficient as the right lane mark candidate data corresponding to the lane mark defining the right side of the actual lane.

27. The vehicle according to claim 26, wherein the selection means determines the left shape information in the lane data based on the polynomial approximating the left dot sequence of the selected left lane mark candidate data, and determines the right shape information in the lane data based on the polynomial approximating the right dot sequence of the selected right lane mark candidate data.

28. A lane recognition device comprising:
an image acquisition means for acquiring a color image of a road via an imaging means mounted on a vehicle;
a lane mark detection means for performing processing of detecting lane marks of a plurality of predetermined colors different from each other on the road based on color information of the color image, and outputting a result of the processing as lane mark candidate data;
a selection means for selecting lane mark candidate data corresponding to a lane mark defining an actual lane on which the vehicle is traveling from among at least the lane mark candidate data for the respective predetermined colors output from the lane mark detection means, and determining and outputting lane data indicating information of the actual lane based on the selected lane mark candidate data; and
a road stud detection means for performing processing of detecting a lane mark of a stud type on the road on which the vehicle is traveling from the color image based on a shape pattern of the lane mark of the stud type, and outputting a result of the processing as lane mark candidate data, wherein
the selection means selects the lane mark candidate data corresponding to the lane mark defining the actual lane on which the vehicle is traveling from among the lane mark candidate data for the respective predetermined colors output from the lane mark detection means and the lane mark candidate data output from the road stud detection means.

29. The lane recognition device according to claim 28, wherein
each of the lane mark candidate data has lane mark position data indicating a position of the lane mark, color information of the lane mark, and type information of the lane mark,
the lane data output by the selection means has shape information of the actual lane, color information of the lane mark defining the actual lane, and type information of the lane mark defining the actual lane, and
the selection means determines the shape information in the lane data based on the lane mark position data in the selected lane mark candidate data, determines the color information in the lane data based on the color information in the selected lane mark candidate data, and determines the type information in the lane data based on the type information in the selected lane mark candidate data.

30. The lane recognition device according to claim 29, comprising a meaning determination means for performing processing of determining a meaning of the lane mark defining the lane based on the color information and the type information in the lane data output by the selection means, and outputting a result of the processing together with the lane data.

31. The lane recognition device according to claim 29, wherein
the lane mark position data in each of the lane mark candidate data is comprised of coordinate data of a dot sequence indicating a route of the lane mark, and
the selection means obtains, for each of the lane mark candidate data, a polynomial of predetermined degree of at least second degree approximating the dot sequence based on the coordinate data of the dot sequence, and calculates a determination coefficient that is a coefficient indicating a degree of approximation of the dot sequence by the polynomial, to select the lane mark candidate data having the highest determination coefficient as the lane mark candidate data corresponding to the lane mark defining the actual lane.

32. The lane recognition device according to claim 31, wherein the selection means determines the shape information in the lane data based on the polynomial approximating the dot sequence of the selected lane mark candidate data.

33. The lane recognition device according to claim 28, wherein
   each of the lane mark candidate data is comprised of left lane mark candidate data that is candidate data for a lane mark defining a left side of the lane and right lane mark candidate data that is candidate data for a lane mark defining a right side of the lane, the left lane mark candidate data having lane mark position data indicating a position of the lane mark defining the left side of the lane, color information of the lane mark, and type information of the lane mark, and the right lane mark candidate data having lane mark position data indicating a position of the lane mark defining the right side of the lane, color information of the lane mark, and type information of the lane mark,
   the lane data output by the selection means has left shape information that is shape information of a left side line defining a left side of the actual lane, left color information that is color information of the lane mark defining the left side line, left type information that is type information of the lane mark defining the left side line, right shape information that is shape information of a right side line defining a right side of the actual lane, right color information that is color information of the lane mark defining the right side line, and right type information that is type information of the lane mark defining the right side line, and
   the selection means selects the left lane mark candidate data corresponding to the lane mark defining the left side of the actual lane from among the left lane mark candidate data, and selects the right lane mark candidate data corresponding to the lane mark defining the right side of the actual lane from among the right lane mark candidate data, determines the left shape information in the lane data based on the lane mark position data in the selected left lane mark candidate data, determines the left color information in the lane data based on the color information in the selected left lane mark candidate data, and determines the left type information in the lane data based on the type information in the selected left lane mark candidate data, and also determines the right shape information in the lane data based on the lane mark position data in the selected right lane mark candidate data, determines the right color information in the lane data based on the color information in the selected right lane mark candidate data, and determines the right type information in the lane data based on the type information in the selected right lane mark candidate data.

34. The lane recognition device according to claim 33, comprising meaning determination means for performing processing of determining meanings of the lane marks defining the left side line and the right side line based on the left color information, the right color information, the left type information, and the right type information in the lane data output by the selection means, and outputting a result of the processing together with the lane data.

35. The lane recognition device according to claim 33, wherein
   the lane mark position data in each of the left lane mark candidate data is comprised of coordinate data of a left dot sequence that is a dot sequence indicating a route of the lane mark defining the left side of the lane, and the lane mark position data in each of the right lane mark candidate data is comprised of coordinate data of a right dot sequence that is a dot sequence indicating a route of the lane mark defining the right side of the lane, and
   the selection means obtains, for each of the left lane mark candidate data, a polynomial of predetermined degree of at least second degree approximating the left dot sequence based on the coordinate data of the left dot sequence, and calculates a determination coefficient that is a coefficient indicating a degree of approximation of the left dot sequence by the polynomial, to select the left lane mark candidate data having the highest determination coefficient as the left lane mark candidate data corresponding to the lane mark defining the left side of the actual lane, and also obtains, for each of the right lane mark candidate data, a polynomial of predetermined degree of at least second degree approximating the right dot sequence based on the coordinate data of the right dot sequence, and calculates a determination coefficient that is a coefficient indicating a degree of approximation of the right dot sequence by the polynomial, to select the right lane mark candidate data having the highest determination coefficient as the right lane mark candidate data corresponding to the lane mark defining the right side of the actual lane.

36. The lane recognition device according to claim 35, wherein the selection means determines the left shape information in the lane data based on the polynomial approximating the left dot sequence of the selected left lane mark candidate data, and determines the right shape information in the lane data based on the polynomial approximating the right dot sequence of the selected right lane mark candidate data.

* * * * *